(12) United States Patent
Broden et al.

(10) Patent No.: US 7,124,641 B2
(45) Date of Patent: Oct. 24, 2006

(54) CAPACITIVE PRESSURE TRANSMITTER

(75) Inventors: David A. Broden, Andover, MN (US); David A. Horky, Mound, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/922,350

(22) Filed: Aug. 20, 2004

(65) Prior Publication Data

US 2005/0016286 A1    Jan. 27, 2005

Related U.S. Application Data

(62) Division of application No. 10/438,446, filed on May 15, 2003, now Pat. No. 6,843,133.

(60) Provisional application No. 60/389,804, filed on Jun. 18, 2002.

(51) Int. Cl.
*G01L 9/02* (2006.01)
(52) U.S. Cl. .......................... 73/718; 73/724
(58) Field of Classification Search ................ 73/718, 73/724; 351/283.1; 702/73
See application file for complete search history.

(56) References Cited

U.S. PATENT DOCUMENTS

| | | | |
|---|---|---|---|
| 4,370,890 A | 2/1983 | Frick ........................... 73/718 |
| 4,458,537 A | 7/1984 | Bell et al. ..................... 73/718 |
| 4,833,922 A | 5/1989 | Frick et al. ................... 73/756 |
| 5,315,877 A | 5/1994 | Park et al. .................... 73/724 |
| 5,693,887 A * | 12/1997 | Englund et al. ............... 73/723 |
| 5,852,244 A * | 12/1998 | Englund et al. ............... 73/706 |
| 5,869,766 A * | 2/1999 | Cucci et al. ................... 73/706 |
| 5,870,695 A * | 2/1999 | Brown et al. ................ 702/138 |
| 5,899,962 A * | 5/1999 | Louwagie et al. ........... 702/138 |
| 6,089,097 A * | 7/2000 | Frick et al. ................... 73/718 |
| 6,295,875 B1 * | 10/2001 | Frick et al. ................... 73/718 |
| 6,484,585 B1 * | 11/2002 | Sittler et al. .................. 73/718 |

* cited by examiner

*Primary Examiner*—Edward Lefkowitz
*Assistant Examiner*—Andre Allen
(74) *Attorney, Agent, or Firm*—Westman, Champlin & Kelly, P.A.

(57) ABSTRACT

A capacitive pressure transmitter is provided. In one aspect, the transmitter includes a capacitive pressure sensor coupled directly to the measured media without any intervening fluid isolation. A filter is preferably used to keep particulates from reaching the measuring diaphragm. In another aspect, a capacitive pressure transmitter is provided with at least one self-contained isolator interposed between a process connection and the capacitive pressure sensor. In both aspects, the capacitive pressure transmitter is relatively small and preferably constructed from materials that facilitate low-cost manufacture.

7 Claims, 3 Drawing Sheets

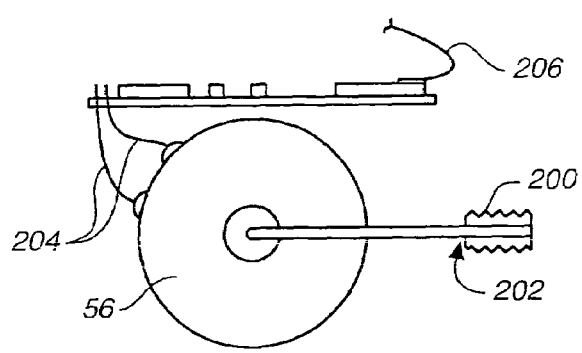
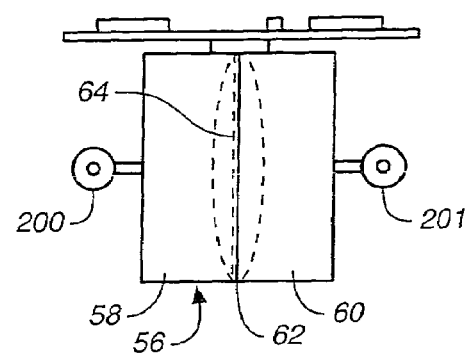
FIG._1A  FIG._1B
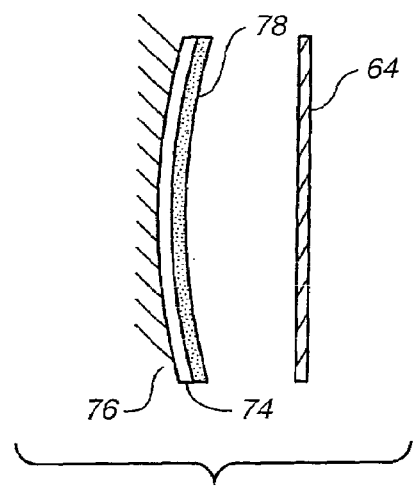
FIG._1C

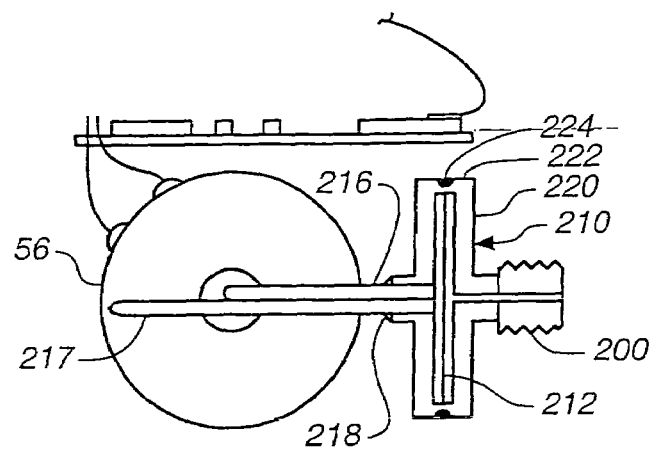
FIG._2A
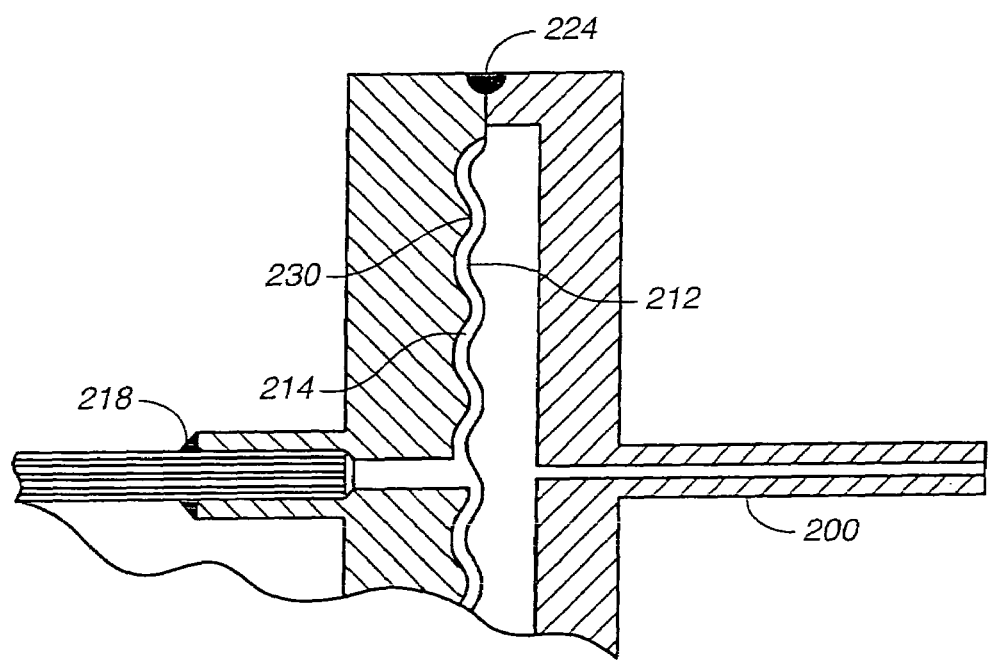
FIG._2B

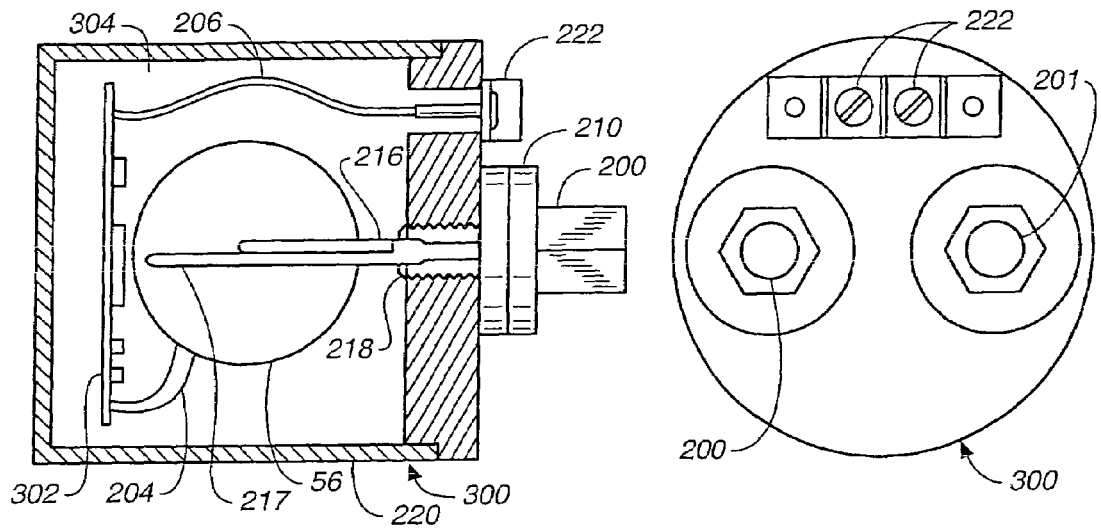
FIG._3A
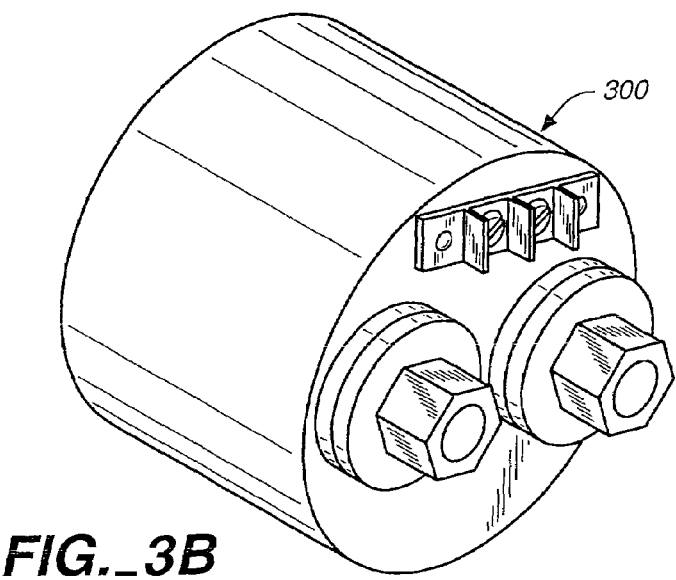
FIG._3C
FIG._3B

CAPACITIVE PRESSURE TRANSMITTER

This application is a divisional application of U.S. patent application Ser. No. 10/438,446 filed May 15, 2003, now U.S. Pat. No. 6,843,133 which claims the priority of an earlier filed co-pending provisional patent application Ser. No. 60/389,804, filed Jun. 18, 2002 entitled MINIATURE LOW-COST CAPACITIVE PRESSURE TRANSMITTER.

BACKGROUND OF THE INVENTION

Low-cost pressure monitoring and control devices are used by a variety of industries, such as the Heating Ventilation and Air Conditioning market. This market tends to be serviced by lower performance and lower cost devices than industrial process control and monitoring systems. This is due to a number of reasons. For example, industrial process and control and monitoring systems often require exacting precision, intrinsic safety, explosion-proof enclosures, device calibration and diagnostics. In contrast, low-cost markets typically require simply that a pressure signal is acquired and that the cost of the system itself is extremely low. However, many features of industrial process control transmitters would be useful to these low-cost markets if such features could be provided without unduly increasing unit cost. The primary design criteria, in this regard, are the electronics size and cost. For example, the low-cost pressure control and monitoring market could benefit from Smart/HART features (calibration, error corrections, alarms . . . ) while also giving analog 4–20 mAmp or 1–5 volt signal.

Recently, advances have been made in capacitive pressure sensing devices that provide more accuracy over a wider pressure range. One example includes the pressure transmitter described in U.S. Pat. No. 6,295,875. The capacitive pressure sensor disclosed therein can be provided with a non-conductive protective coating (such as silicon oxide) over the internal electrodes. Such overcoatings not only provide excellent over-pressure protection. If a pressure transmitter could be provided with sufficiently low cost, while still providing a host of functions common to the industrial process measurement and control market, low cost markets, such as the HVAC market would benefit tremendously.

SUMMARY OF THE INVENTION

A capacitive pressure transmitter is provided. In one aspect, the transmitter includes a capacitive pressure sensor coupled directly to the measured media without any intervening fluid isolation. A filter is preferably used to keep particulates from reaching the measuring diaphragm. In another aspect, a capacitive pressure transmitter is provided with at least one self-contained isolator interposed between a process connection and the capacitive pressure sensor. In both aspects, the capacitive pressure transmitter is relatively small and preferably constructed from materials that facilitate low-cost manufacture.

BRIEF DESCRIPTION OF THE DRAWINGS

FIGS. 1A, 1B and 1C are diagrammatic views of a capacitive pressure sensor and associated circuitry in accordance with an embodiment of the present invention.

FIGS. 2A and 2B are diagrammatic views of portions of a capacitive pressure transmitter employing a self-contained isolator in accordance with another embodiment of the present invention.

FIGS. 3A–3C are diagrammatic views of a capacitive pressure transmitter in accordance with an embodiment of the present invention.

DETAILED DESCRIPTION OF THE PREFERRED EMBODIMENTS

While preferred embodiments of the present invention use particularly useful in combination with the pressure sensor described in U.S. Pat. No. 6,295,875, other pressure sensor designs can be used as well.

Many times, a pressure sensor is isolated from the measured media. This isolation is very important where the media is at a very high temperature or is very corrosive or otherwise harmful. However, in certain application, this costly feature may be disposed with and the measured media be provided directly to a deflectable diaphragm.

FIG. 1A illustrates this aspect of an embodiment of the present invention. Pressure sensor 56, which can be any suitable sensor, including that described in the '875 patent, is coupled directly to process connection 200 such that the media to be measured is conveyed directly into pressure sensor 56. A particulate filter 202 can also be interposed between process connection 200 and pressure sensor 56 if the media has not otherwise been filtered. Preferably, particulate filter 202 is a 45–70 micron filter interposed between process connection 200 and pressure sensor 56.

FIG. 1B is an elevation view of pressure sensor 56, which is preferably formed of two halves 58, 60. These halves 58, 60 are bonded, preferably welded, along seam 62. Halves 58, 60 form a pressure chamber within which a deflectable diaphragm 64 sits fluidically isolating connection 200 from connection 201. When a differential pressure is applied to connections 200, 201, diaphragm 64 will deflect in response to the pressure and the deflection can be registered as a change in capacitance in accordance with known techniques.

FIG. 1C is a partial cross-section of an area within sensor 56 illustrating diaphragm 64, conductive capacitive plate 74, chamber wall 76, and non-conductive coating 78. While not specifically illustrated, the mirror image of plate 74, chamber wall 76 and non-conductive coating 78 also exist on the other side of deflectable diaphragm 74. Capacitive plate 74 may be deposited or otherwise positioned upon chamber walls 76 in accordance with any suitable known techniques. Thereafter, in some embodiments, a non-conductive coating, such as coating 78, can be deposited on top of plate 74. This non-conductive coating does not substantially interfere with the capacitive coupling between plate 74 and deflectable diaphragm 64. However, coating 78 does keep diaphragm 64 from coming in direct electrical contact with plate 74 and also maintains electrical isolation for process media fluids that are conductive.

Conductors 204 are coupled to appropriate circuitry, such as that described in the '875 patent to measure the capacitance changes caused by pressure acting through connections 200, 201 and provide a suitable output on lines 206. This output can be representative of differential pressure, flow or other paramters.

The low-cost pressure transmitter illustrated in FIG. 1 can provide a significant number, if not all, of the features of current industrial process control and measurement transmitters. The application would typically be measuring pressure of a non-condensing gas such as air. Performance would be determined generally by the amount of digital correction added by the circuitry and the nature of the gas measured. However, even at very high humidities, the dielectric change can be substantially canceled by using suitable sensor geometries. One example of such a sensor geometry is that disclosed in the '875 Patent. This pressure transmitter provides very high over pressure protection in a range of 1000–2000 pounds per square inch (psi). Further, the pressure transmitter does not require any costly mounting effects such as oil fill. Further still, the pressure transmitter is substantially reduced in size since it need not generally be provided in a field-hardened enclosure that provides explosion-proof benefits thereby reducing size and cost. Finally, high-level transmitter functions (such as digital communications, alarms, square root output, and diagnostics) that are well-accepted within the industrial process and control monitoring field can now be provided to the low-cost markets.

FIG. 2A is a diagram of an aspect of the present invention used in a process media isolated embodiment. Specifically, self-contained isolator 210 is interposed between process connection 200 and pressure sensor 56 such that the media to be measured exerts a pressure on isolator diaphragm 212 (preferably a metal foil diaphragm), which in turn exerts pressure on isolator fluid 214, which is preferably a dielectric fill fluid such as silicone oil. The isolators are preferably comprised of two halves 220, 222 joined together by weld 224, such as a laser weld, and coupled to tubing 216, 217 and thus pressure sensor 56 via braze joint 218. Preferably isolation fluid sensor tube 216, and isolation fluid fill tube 217 have end shaped such that both tubes 216, 217 enter a single port on self-contained isolator 210. For example, ends of each tube 216, 217 may be shaped as a 'D', one being the mirror image of the other, such that they fit a circular port in isolator 210.

FIG. 2B is an enlarged diagrammatic view of a portion of self-contained isolator 210. On the isolator fluid side of diaphragm 212, the chamber may include a number of convolutions as indicated at 230. However, in some embodiments these convolutions may be omitted.

FIG. 3A is a cross-sectional diagrammatic view of a low-cost pressure transmitter in accordance with an embodiment of the present invention. FIG. 3A illustrates low-cost pressure transmitter 300 in accordance with aspects of the present invention. Transmitter 300 includes a self-contained isolator 210. However, in embodiments where the process media can be coupled directly to the measuring diaphragm, self-contained isolator 210 may be omitted thereby providing additional size and cost savings. Sensor 56 is disposed within housing 220 which is preferably constructed from a low-cost material, such as injection moldable plastic. As shown in FIG. 3A, a pair of electrical connectors 222 are coupled to lines 206 and disposed on top of transmitter 300 for coupling transmitter 300 to an external communication loop (not shown).

Circuit board 302 preferably has a circular shape to fit within housing 220 as illustrated in FIG. 3A. If desired, the free space within housing 220 can be filled with a suitable non-conductive material, such as an epoxy, in order to increase the robustness of the transmitter. When assembled, in one embodiment pressure transmitter 300 is relatively small preferably having a height of approximately two inches and length and width each of approximately 2.5 inches. This size allows transmitter 300 to be usable in a number of environments where traditional industrial process control transmitter were simply not feasible. Moreover, the simple design and small size allow the transmitter to be manufactured less expensively than traditional industrial process control transmitters. However, the known process control and measurement circuitry, such as a microprocessor and/or a FOUNDATION™ Fieldbus communication controller can be provided on circuit board 302 to provide a level of functionality to the low-cost markets that has not previously been known. FOUNDATION™ Fieldbus is a communication protocol that is opened and interoperable. It provides a digital communication link among intelligent field devices. However, any other suitable process industry standard communication protocols can be employed in accordance with embodiments of the present invention.

Although the present invention has been described with reference to preferred embodiments, workers skilled in the art will recognize that changes may be made in form and detail without departing from the spirit and scope of the invention.

The invention claimed is:

1. A capacitive pressure transmitter comprising:
   a capacitive pressure sensor including:
      a sensor body defining a chamber therein, the sensor body having a plurality of sensor inlets in fluidic communication with the chamber;
      a conductive deflectable diaphragm disposed in the chamber;
      at least one capacitive plate disposed in the chamber relative to the diaphragm such that diaphragm deflection generates a change in capacitance between the at least one plate and the diaphragm; and
      a non-conductive layer interposed between the at least one plate and the diaphragm; and
   a process media inlet operably coupled to one of the plurality of sensor inlets and adapted to couple to a source of process media to bring the process media into direct contact with the measuring diaphragm;
   a transmitter inlet operably coupled to the other of the plurality of sensor inlets;
   sensor circuitry coupled to the capacitive pressure sensor to generate a sensor signal based upon the capacitance of the capacitive pressure sensor; and
   transmitter circuitry coupled to the sensor circuitry to transmit information relative to the sensor signal over a process communication loop.

2. The transmitter of claim 1, wherein the transmitter inlet is adapted to couple to a source of process media, and wherein the sensor signal is indicative of differential pressure between the process media inlet and the transmitter inlet.

3. The transmitter of claim 1, wherein the non-conductive layer includes an oxide.

4. The transmitter of claim 3, wherein the oxide is a silicon oxide.

5. The transmitter of claim 1, and further comprising a filter fluidically interposed between the process media inlet and the one of the plurality of sensor inlets.

6. The transmitter of claim 5, wherein the filter does not pass particles larger than about 70 microns.

7. The transmitter of claim 6, wherein the filter does not pass particles larger than about 45 microns.

* * * * *